(12) United States Patent
Heitmeyer et al.

(10) Patent No.: US 9,174,656 B2
(45) Date of Patent: Nov. 3, 2015

(54) INSULATIVE RAILWAY BOXCAR

(75) Inventors: Kris Heitmeyer, West Linn, OR (US); Dan Militaru, Tigard, OR (US)

(73) Assignee: Gunderson LLC, Portland, OR (US)

( * ) Notice: Subject to any disclaimer, the term of this patent is extended or adjusted under 35 U.S.C. 154(b) by 1480 days.

(21) Appl. No.: 11/234,422

(22) Filed: Sep. 23, 2005

(65) Prior Publication Data

US 2007/0068418 A1    Mar. 29, 2007

(51) Int. Cl.
*B61D 17/08*    (2006.01)
*B61D 27/00*    (2006.01)
*B60P 3/20*    (2006.01)

(52) U.S. Cl.
CPC .............. *B61D 27/0027* (2013.01); *B60P 3/20* (2013.01)

(58) Field of Classification Search
USPC ......... 105/355, 396, 404, 409, 410, 413, 422, 105/423
See application file for complete search history.

(56) References Cited

U.S. PATENT DOCUMENTS

| | | | |
|---|---|---|---|
| 3,952,455 A * | 4/1976 | McAlarney | 49/496.1 |
| 6,367,391 B1 * | 4/2002 | Thoman et al. | 105/404 |
| 6,941,875 B2 * | 9/2005 | Norton et al. | 105/397 |
| 7,228,805 B2 * | 6/2007 | Beers et al. | 105/423 |
| 7,434,520 B2 * | 10/2008 | Zupancich et al. | 105/423 |
| 2002/0046678 A1 * | 4/2002 | Fecko et al. | 105/404 |
| 2005/0029751 A1 * | 2/2005 | Schmid | 277/637 |

* cited by examiner

Primary Examiner — R. J. McCarry, Jr.
(74) Attorney, Agent, or Firm — Chernoff, Vilhauer, McClung & Stenzel, LLP (57) ABSTRACT

A freight car having insulative material interposed between inner and outer enclosures of the freight car.

29 Claims, 11 Drawing Sheets

INSULATIVE RAILWAY BOXCAR

BACKGROUND OF THE INVENTION

The present invention relates to thermally insulated railroad freight cars and in particular to a freight car having insulative material interposed between inner and outer enclosures of the freight car.

Existing boxcars typically include opposed side walls, opposed bulkheads, a floor, a roof, and at least one doorway together defining a cargo-carrying enclosure that is mounted upon a supporting undercarriage with a wheel assembly for movement upon a railroad track. A typical existing boxcar will include a supporting undercarriage having a longitudinal center sill, body bolsters, side sills, cross bearers, and cross ties that are each made of iron, steel, or other rigid metal. This undercarriage may then support the side walls, bulkheads, and roof, which are also typically of metal construction.

Though the boxcar construction just described is adequate to transport heavy loads, such boxcars are often insufficient to transport over large distances perishable cargo or other cargo that must be maintained at a low temperature. One existing solution is to construct an insulated boxcar capable of maintaining a desired temperature of enclosed cargo by preventing heat from entering the enclosure. Various types of insulated railway boxcars are presently manufactured and used. A typical insulated railway boxcar includes an enclosed structure having an outer surface, usually of metal, one or more layers of foam or fiber insulation, and an interior surface of metal, though the interior surface is sometimes formed from wood and/or fiber-reinforced composite material as desired for the specific application.

One problem with these existing insulated boxcars is that the floor of the insulated enclosure must be able to withstand, without significant deformation, substantial loading from both the cargo carried by the boxcar and the concentrated weight of forklifts or other machinery used to load and unload cargo from the boxcar. Further, the sides of the boxcar enclosure must have sufficient strength to withstand the impacts of shifting loads during transport that batter the interior surface of the boxcar enclosure. Because fiber reinforced composite material does not have the strength of steel, insulated boxcars enclosures are typically fabricated with thicker floors, bulkheads, and side walls to better withstand the forces encountered during transport of cargo.

An alternative to an insulated boxcar is a refrigerated boxcar that uses a refrigeration unit to maintain the interior of the boxcar enclosure at a desired temperature. These refrigeration units are costly to install, and unless used in combination with an existing insulated boxcar with the aforementioned disadvantages, are costly to operate due to the transfer of heat into the interior of the boxcar enclosure.

What is desired, therefore, is an improved structure for insulating a boxcar.

SUMMARY OF THE INVENTION

A first aspect of the disclosure may include a railway car comprising a cargo-carrying enclosure having an inner enclosure defining an inwardly directed surface against which cargo can bear and an outer enclosure defining an outwardly directed surface exposed to an ambient environment surrounding said boxcar. A structural member may have an inner portion supporting the inner surface, an outer portion supporting the outer surface, and a thermally insulative spacer interposed between the inner portion and the outer portion.

Another aspect of the disclosure may include, in combination with a cargo-carrying enclosure of a railway car, a vertically-oriented load-bearing post comprising an inner portion, an outer portion, and a thermally insulative spacer interposed between said inner portion and said outer portion.

Another aspect of the disclosure may include, in combination with a cargo-carrying enclosure of a railway car, a horizontally oriented load-bearing sill comprising an inner portion, an outer portion, and a thermally insulative spacer interposed between said inner portion and said outer portion.

Another aspect of the disclosure may include a railway car having a cargo-carrying enclosure comprising a metal outer enclosure exposed to an ambient environment, a metal inner enclosure against which cargo can bear, and a non-metallic insulative liner thermally isolating inner enclosure from said outer enclosure.

Another aspect of the disclosure may include, in combination with a cargo-carrying enclosure of a railway car defining a doorway and a door selectively engageable with the doorway, a gasket comprising flexible material defining a first chamber and a second chamber each isolated from one another, at least one of the chambers dividing into a plurality of component chambers when the door is engaged with said doorway, each component chamber being isolated from at least one other of the plurality of component chambers.

DETAILED DESCRIPTION

Figure 1:
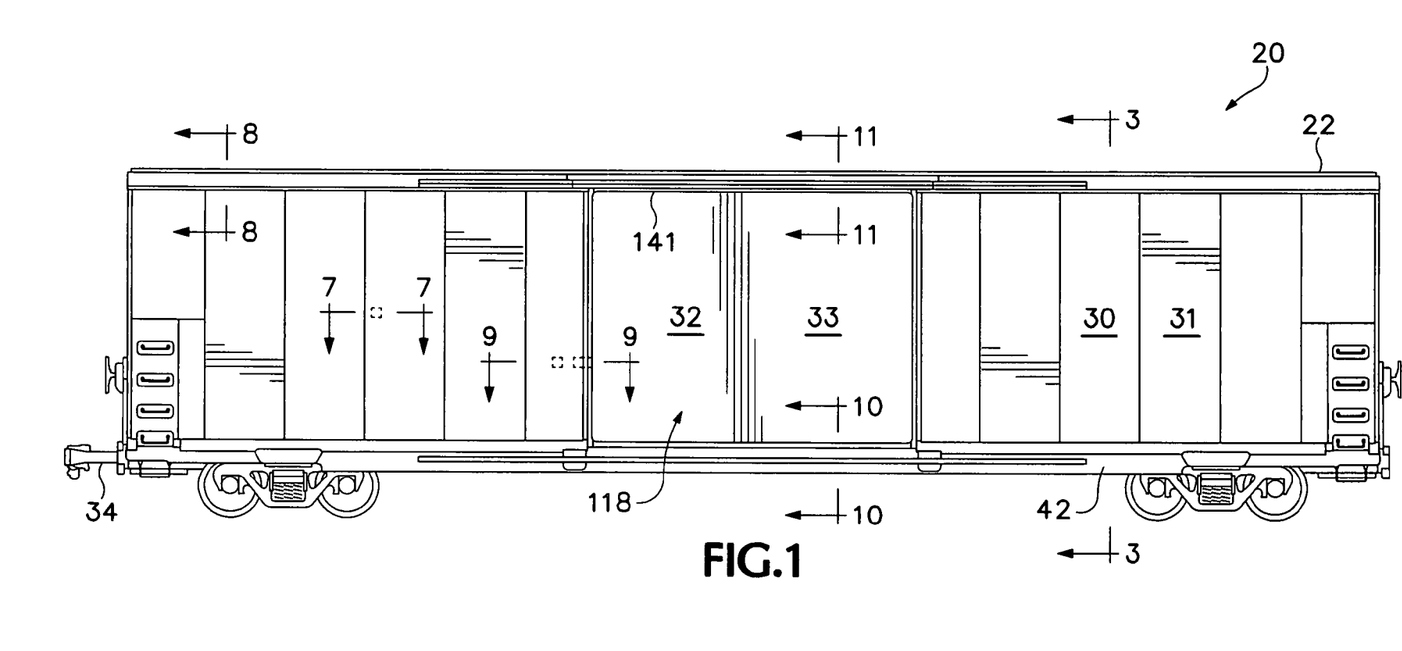
FIG. 1 is a side elevational view of a railway car constructed in accordance with the disclosed invention.
Figure 2:
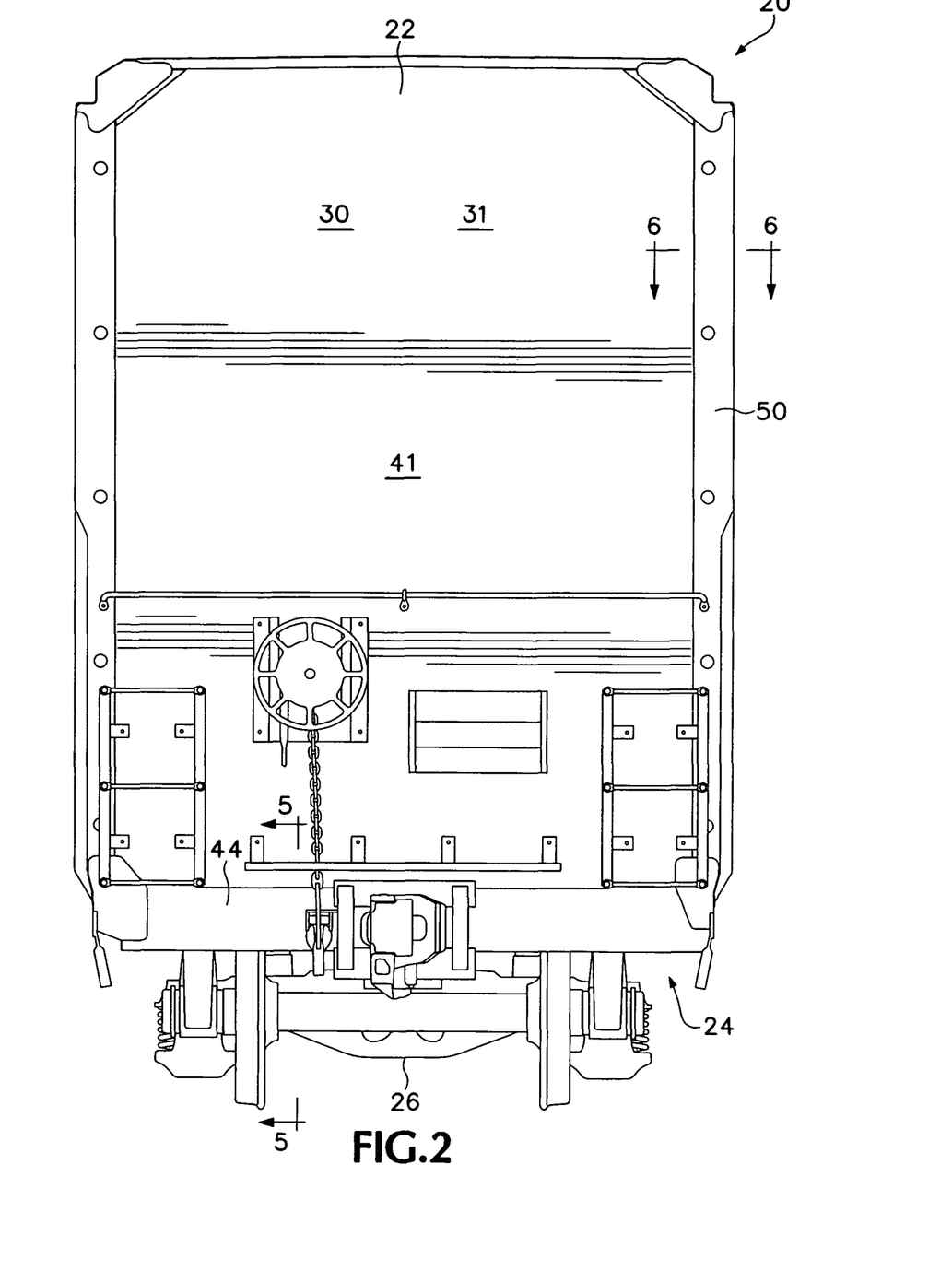
FIG. 2 is an end view of the railway car of FIG. 1
Figure 13:
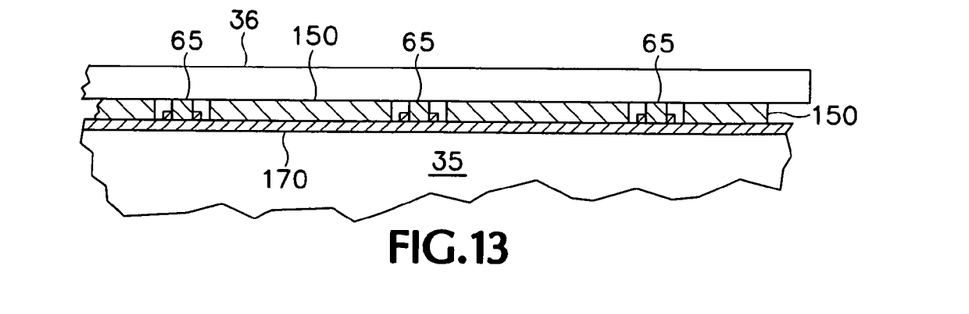
FIG. 13 is a sectional view taken along line 13-13 of FIG. 12.
Figure 14:
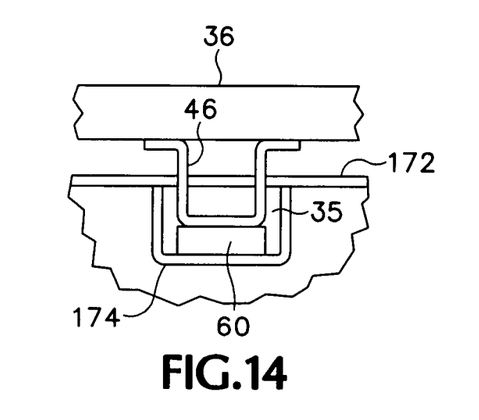
FIG. 14 is a view taken along line 14-14 of FIG. 12
Figure 15:
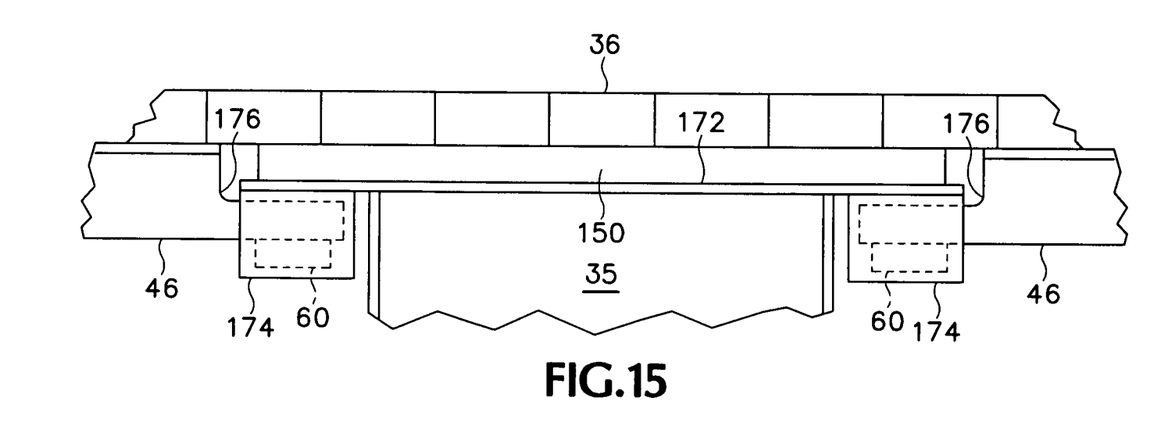
FIG. 15 is a view taken along line 15-15 of FIG. 12.

FIGS. 1 and 2 show an insulated rail car 20 having a cargo-carrying enclosure 22 supported by an undercarriage 24 and a plurality of wheeled trucks 26 that facilitate the movement of the insulated rail car 20 along a rail track. The undercarriage 24 preferably includes a center sill 34 extending longitudinally along the length of the rail car 20, opposed end sills 44, opposed side sills 42, body bolsters 35, (shown in FIG. 13) cross bearers 48 (shown in FIG. 4) and cross ties (not shown) that together provide the necessary underlying structural support for the cargo-carrying enclosure 22. The cargo carrying enclosure 22 has an outer enclosure 30 defining an outwardly facing exterior surface 31 exposed to an ambient environment and an inner enclosure 32 defining an inwardly directed interior surface 33 against which cargo can bear and which is exposed to an interior environment.

As stated previously, it is desired that insulated rail cars such as the rail car 20 be capable of maintaining a controlled interior environment, frequently at a temperature substantially different from that of the ambient environment, for a prolonged time and without refrigeration due to its attendant energy costs. Also as stated previously, some existing insulated rail cars seek to achieve this goal by providing an insulated rail car having a cargo-carrying enclosure of a composite construction, including composite interior and exterior side walls, composite floors, composite side posts, corner posts, etc. The disadvantage of this type of rail car is that it may have substantially less structural strength as compared to a rail car having a cargo-carrying enclosure of metal construction, such as steel, iron, etc.

Other existing rail cars provide desired strength by retaining a steel or other metal construction but insert polyurethane foam into the intervening space between the outer and inner side walls, end walls, etc. The problem with this type of existing insulated rail car is that the retention of metal structural members between the inner and outer enclosures, e.g. the side posts, side sills, corner posts, etc., substantially diminishes the insulative properties of the rail car, even with the addition of foam insulation in the remaining gaps between the inner and outer enclosures.

The present inventors realized that an improved insulative rail car could be constructed that includes metal exterior and interior enclosures including a metal floor and metal interior side walls, and that is reinforced by metal structural members such as side posts, side sills, etc., but nonetheless has substantially improved insulative properties as compared to exiting insulated rail cars. This improvement is achieved by dramatically reducing, if not eliminating, the metallic connection between the metal interior enclosure and the outer enclosure.

Figure 3:
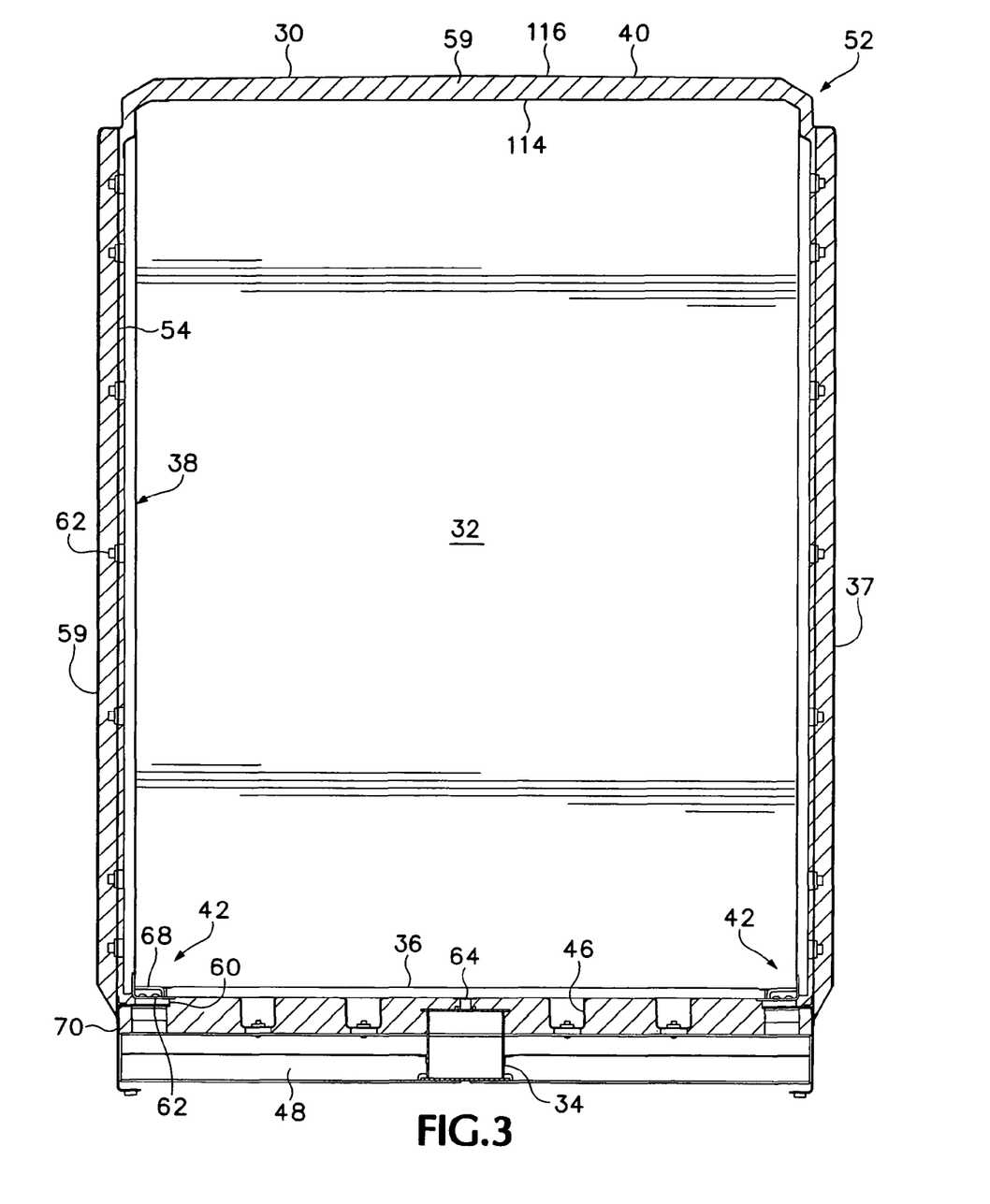
FIG. 3 is a sectional view taken along line 3-3 of FIG. 1.

Referring to FIG. 3, the disclosed insulated rail car 20 preferably has a metal outer enclosure 30 including exterior side walls 37 of metal, exterior end walls (shown in FIG. 2) of metal, and a top roof member 116 of metal, as well as an inner enclosure 32 comprising a floor 36 of metal, interior side walls 38 of metal, interior end walls 39 of metal, and a lower roof member 114 of metal. Alternatively, the rail car 26 may include an inner enclosure 32 comprising one or more composite members, such as a composite floor 36, composite interior side walls 38, composite interior end walls 39, and a composite lower roof member 114. The rail car 20 may also have metal structural reinforcements such as a metal center sill 34, metal side sills 42, metal end sills 44 (shown in FIG. 5), metal longitudinal stringers 46, metal cross bearers 48, cross ties (not shown), metal corner posts 50 (shown in FIG. 2), a metal top chord 52, metal side posts 54, metal door posts 56 (shown in FIG. 8), and a metal door header 58 (shown in FIG. 10). Unless otherwise stated, the terms metal or metallic, in the preferred embodiment will mean steel, however it should be understood that other metals, such as iron, may be substituted. The aforementioned metallic construction of the rail car 20 provides substantial strength to withstand bending and other stresses during transport of cargo over a rail track, as well as strength to withstand the impacts of cargo shifting during transport and the weight of cargo and forklifts loading and unloading cargo into and out of the rail car 20, respectively.

The insulated rail car 20, may also preferably include foam insulation 59 in the intervening space between the inner enclosure 32 and the outer enclosure 30 not occupied by one of the aforementioned metal structural reinforcements, e.g. the side posts 54, etc. Unlike existing rail cars, however, the insulated rail car 20 achieves additional insulative protection by providing one or more insulated structural reinforcements that have an inner metal portion (e.g. the inner side sill 68 shown in FIG. 4) supporting the interior surface 33, an outer metal portion (e.g. the outer side sill 70) supporting the exterior surface 31, and a composite spacer 60 interposed between the inner metal portion and the outer metal portion. Unless otherwise stated, the term "composite" will refer to fiber-reinforced composite material, although it should be understood that other insulative material may easily be substituted, such as wood, plastic, hardened polyurethane foam, etc. Also, unless otherwise stated, the term "composite spacer 60" will be used to refer to any composite member, as previously defined, that thermally separates an inner metal portion of a second reinforcement from an outer metal portion of a structural reinforcement. The inner metal portion, the outer metal portion, and the composite spacer 60 are preferably secured together by a bolt 62. Thus constructed, the only thermally conductive metallic connection that the insulated structural reinforcement provides between the interior and exterior surfaces 33 and 31 (seen in FIG. 1) is through the bolt 62 or other fastening member. The present inventors have discovered that this minimal thermally conductive path through the bolt 62 is negligible, and even that can be eliminated by either forming the bolt 62 from composite or other insulative material, or more preferably by providing a composite sleeve, described later in this specification, that insulates the bolt 62 from the metallic members that it passes through.

Various embodiments of the disclosed rail car 20 may include any permutation of existing structural reinforcements with disclosed insulated structural reinforcements as is needed to achieve a desired amount of insulative protection. For example, some embodiments may include end sills and side sills each constructed as a disclosed insulated structural reinforcement, other embodiments may include side posts and corner posts each constructed as a disclosed insulated structural reinforcement, while still others may include end sills, side sills and only a portion of the side posts each constructed as disclosed insulated structural reinforcements. Preferably, however, as later described, each side sill, end sill, corner post, side post, door post, top chord, door threshold, and door header is constructed as a disclosed insulated structural reinforcement so as to permit the inner enclosure 32 to be sufficiently insulated from the outer enclosure 30 such that the only thermally conductive metallic connection between the interior and exterior surfaces 33 and 31 is through the bolts 62, as is more particularly described later in this specification. Further, should it be desired to thermally isolate the inner enclosure 32 from the outer enclosure 30, i.e. eliminate the metallic thermal path between the two respective enclosures, the bolt 60 may either be fitted within a composite sleeve that insulates the bolt 62 from the metallic members that it passes through, or may itself be formed of a composite material.

Figures 4, 5:
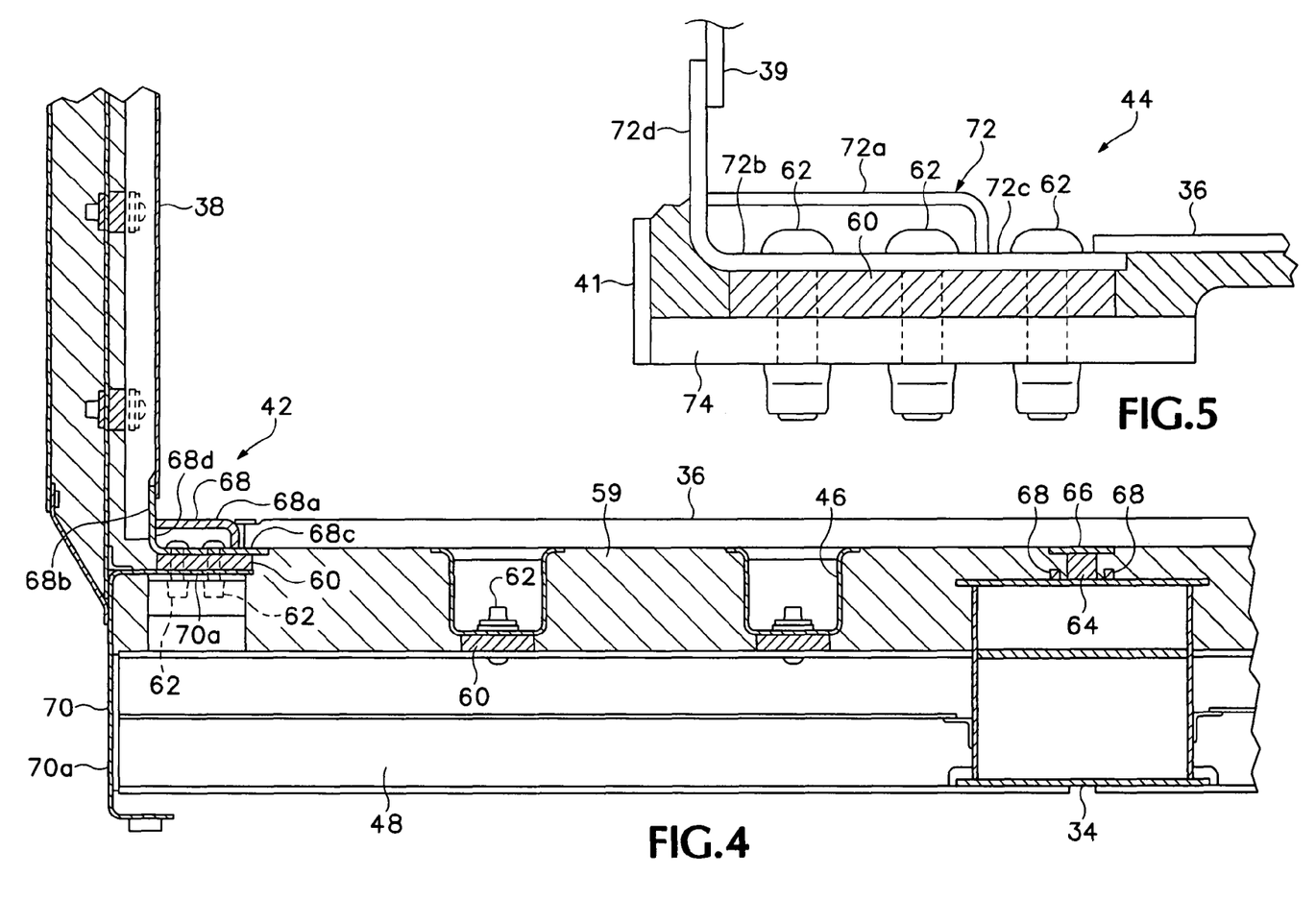
FIG. 4 is an enlarged partial view of the sectional view shown in FIG. 3.
FIG. 5 is a sectional view taken along line 5-5 of FIG. 2 showing an end sill having an inner structural member and an outer structural member separated from one another by a thermally insulative spacer.
Figure 12:
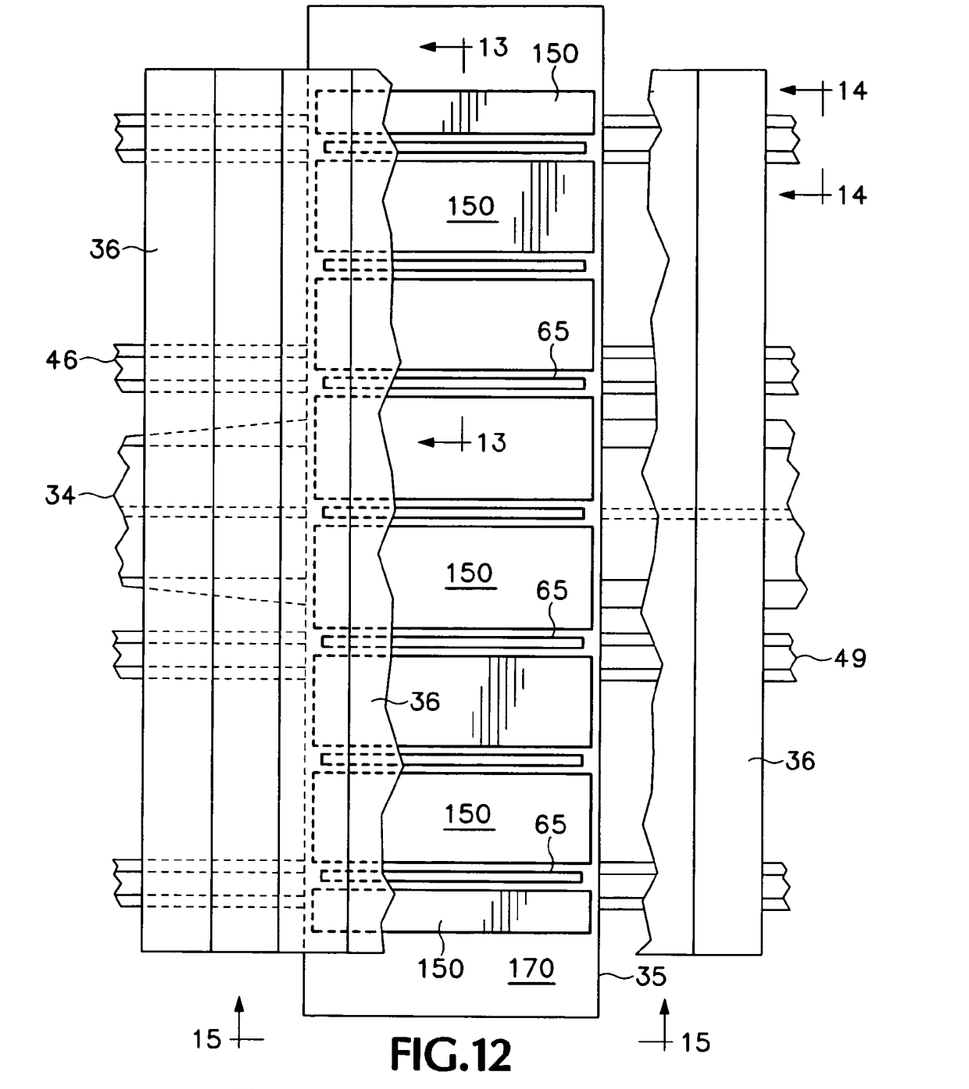
FIG. 12 is a top elevational view of the floor of the rail car of FIG. 1, with a section of the floor removed to show vacuum packs and composite spacers that separate the floor from the undercarriage of the rail car at the bolsters.

Referring to FIGS. 4 and 5, the insulated rail car 20 may include a metal floor 36 supported by structural members including a center sill 34, longitudinal stringers 46, side sills 42, and end sills 44. Preferably, the metal floor 36 is thermally insulated from the exterior surfaces of the rail car exposed to an ambient environment, such as the center sill 34, cross bearers 48, and cross ties 49 (shown in FIG. 12). For example, one or more composite bars 64, extending over the full length of the center sill 34, may separate the floor 36 from the center sill 34. The composite bar 64 is divided into approximately 10-foot sections, though some embodiments of the disclosed rail car 20 may include a composite bar 64 of other lengths or a single composite bar 64 that extends the full length of the center sill 34. A metal plate 66 may secure the upper face of the composite bar 64 to the floor 36. Two parallel sets of guides 68, each guide approximately six inches in length and longitudinally spaced at intervals of approximately three feet along the length of the center sill, may be used to facilitate the installation of the composite bar 54. Similarly, a series of composite spacers 60, inserted at periodic intervals of approximately 54 inches along the length of the longitudinal stringers 46, may separate the longitudinal stringers 46 from the cross bearers 48 and cross ties (not shown). A bolt 62 may be used to secure the longitudinal stringer 46, the cross bearer 48, and the composite spacer 60. To provide further insulation, polyurethane foam 59 or other foam-type insulation may be blown into the remaining spaces of the undercarriage 24 between the floor 36 and the center sill 34, cross bearers, 48 and cross ties (not shown).

To inhibit the flow of heat through the side sills 42, and to inhibit the flow of heat from the floor 36, as well as from the interior side walls 38, to the exterior surfaces of the side sills 42 exposed to an ambient environment, each of the side sills 42 may be an insulative structural reinforcement. More specifically, a side sill 42 shown in FIGS. 4 and 9 may comprise an inner side sill member 68 and an outer side sill member 70. The inner side sill member 68 may comprise two generally L-shaped metal channels 68a and 68b, respectively, welded to one another. The channel 68b may form an approximate 90 degree turn to form a horizontal portion 68c to which the outer lateral edges of the floor 36 may be supported and a vertical portion 68d to which the lower interior side wall 38 may be welded or otherwise secured. The channel 68a may reinforce the channel 68b, having a first end secured to the horizontal portion 69c and a second end secured to the vertical portion 68d, thereby preventing the aforementioned approximate 90 turn from bending. The outer side sill member 70 may also have an approximate 90 degree turn to form a vertical portion 70b that extends downwardly to curl around the lateral edges of the undercarriage, and a horizontal portion 70a generally parallel to the horizontal portion 68c of the inner side sill member 68, separated from the inner side sill member 68 by a composite spacer 60, which thermally isolates the inner side sill member 68 from the outer side sill member 70. The inner side sill member 68, the outer side sill member 70, and the composite spacer 60 may be secured to one another with two bolts 62.

Referring to FIG. 5, to inhibit the flow of heat through the end sills 44, and to inhibit the flow of heat from the floor 36, as well as the interior end walls 39, to the exterior surfaces of the end sills as well as the outer end wall 41 that are each exposed to an ambient environment, each of the end sills 44 may be an insulative structural reinforcement. More specifically, an end sill 44 may comprise an inner end sill member 72 and an outer end sill member 74. The inner end sill member 72 may comprise two generally L-shaped metal channels 72a and 72b, respectively, welded to one another. The channel 72b may form an approximate 90 degree turn to form a horizontal portion 72c to which the outer longitudinal edges of the floor 36 may be supported and a vertical portion 72d to which the lower interior end wall 39 may be welded or otherwise secured. The channel 72a may reinforce the channel 72b, having a first end secured to the horizontal portion 72c and a second end secured to the vertical portion 72d, thereby preventing the aforementioned approximate 90 turn from bending. The outer end sill member 74 may be secured to the outer end wall 41 and be generally parallel to the horizontal portion 72c of the inner end sill member 72, separated from the inner side sill member 72 by a composite spacer 60, which thermally isolates the inner end sill member 72 from the outer side sill member 74. The inner side sill member 72, the outer side sill member 74, and the composite spacer 60 may be secured to one another with three bolts 62.

Figure 6:
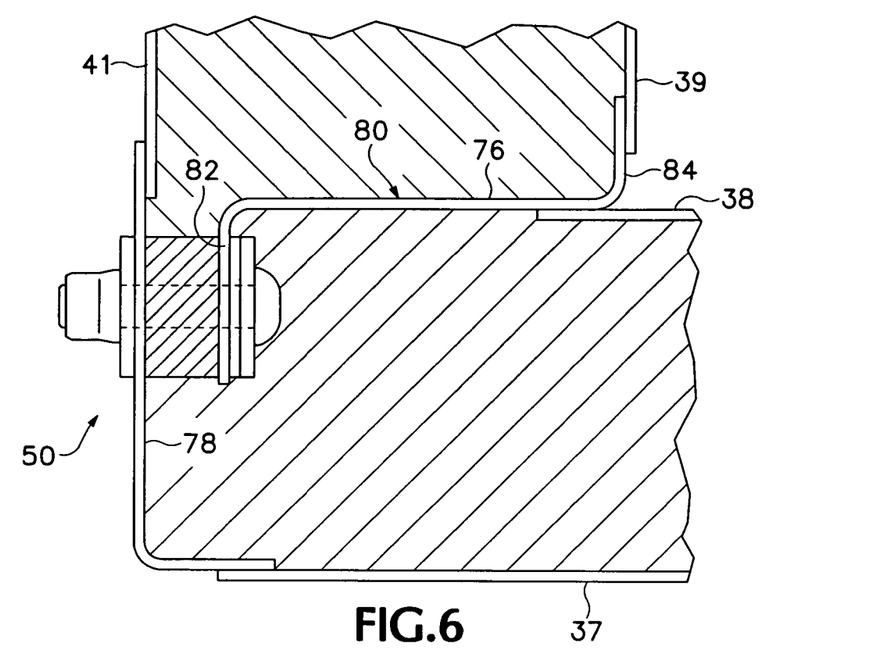
FIG. 6 is a sectional view taken along line 6-6 of FIG. 2 showing a corner post having an inner structural member and an outer structural member separated from one another by a thermally insulative spacer.

Referring to FIG. 6, to inhibit the flow of heat through the corner posts 50, as well as inhibit the flow of heat from the interior side walls 38 and interior end walls 39 to the exterior side walls 37 and exterior end walls 41, respectively, each of the corner posts 50 may be an insulated structural reinforcement. More specifically, a corner post 50 may comprise an inner corner post member 76 and an outer corner post member 78 separated by a composite spacer 60 that thermally isolates the inner and outer corner post members 76 and 78, respectively, from one another. The inner corner post member 76, the outer corner post member 78, and the composite spacer 60 may be secured to one another with a bolt 62. The inner corner post member 76 may have a central, longitudinally oriented base 80 to which the interior side walls 38 may be welded. At the longitudinally outer portion of the base 80 is a laterally outward extending first wing portion 82 and at the longitudinally inner portion of the base 80 is an inwardly extending second wing portion 84 to which the interior end walls 39 may be welded or otherwise secured. The outer corner post member may have an approximate 90 degree turn to form a longitudinally oriented portion 86 to which the exterior side walls 37 may be welded or otherwise secured and a laterally extending portion 88 oriented generally parallel to the first wing portion 82 and to which the exterior end walls 41 may be welded or otherwise secured.

Figure 7:
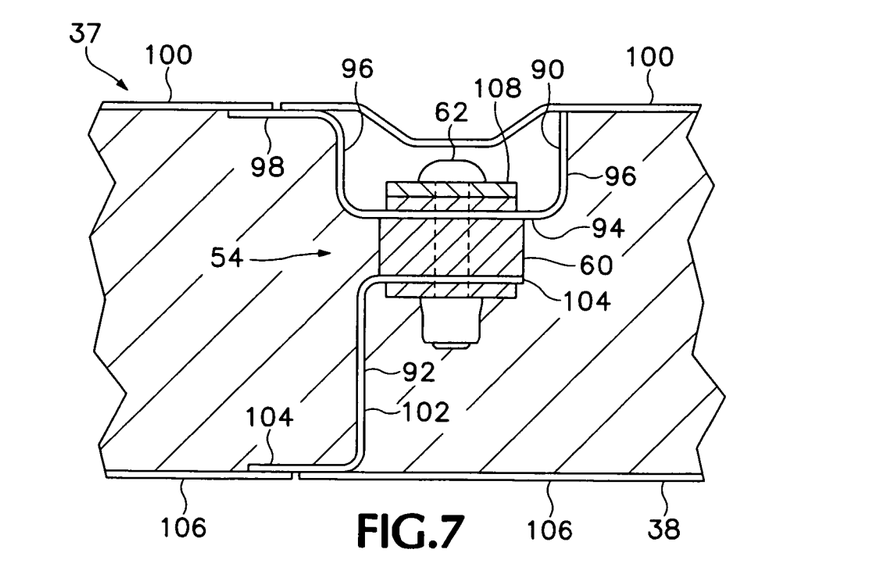
FIG. 7 is a sectional view taken along line 7-7 of FIG. 1 showing a side post having an inner structural member and an outer structural member separated from one another by a thermally insulative spacer.

Referring to FIG. 7, to inhibit the flow of heat through the side posts 54, and to inhibit the flow of heat between the interior and exterior side walls 37 and 38, respectively, each of the side posts 54 may be an insulated structural reinforcement. More specifically, a side post 54 may comprise an inner side post member 90 and an outer side post member 92 separated by a composite spacer 60 that thermally isolates the inner and outer side post members 90 and 92, respectively, from one another. The inner side post member 90, the outer side post member 92, and the composite spacer 60 may be secured to one another with a bolt 62. The inner side post member 90 may form a generally U-shaped channel having a longitudinally oriented central member 94, two laterally oriented wing portions 96 adjoining either side of the central member 94, and a longitudinally oriented tail portion 98 adjoining one of the wing portions 96. In this manner each individual one of a plurality of interior panels 100 that together form the interior side walls 38 may be welded at both longitudinal ends to the respective tail portions 98 of adjacent side posts 54, where a greater surface area is needed for a sturdy weld, and also welded to the edge of the wing portion 96 of a side post 54 without an adjoining tail portion. The outer side post member 92 may be generally Z-shaped, having a laterally oriented central portion 102 and two longitudinally oriented wing portions 104, again so that each individual one of a plurality of exterior panels 106 that together form the exterior side walls 37 may be welded at both longitudinal ends to the respective wing portions 104 of adjacent side posts 54, where a greater surface area is needed for a sturdy weld. Washers 108 of fiber reinforced composite material may be positioned between the head of the bolt 62 and the interior side post member 90, if desired, to further reduce the flow of heat through the bolt 62. Each of the side panels 100 may be outwardly dimpled towards the bolt 62, thus forming a space for a floor anchor aperture (not shown) in the floor 36 of the cargo-carrying enclosure 22.

Figure 8:
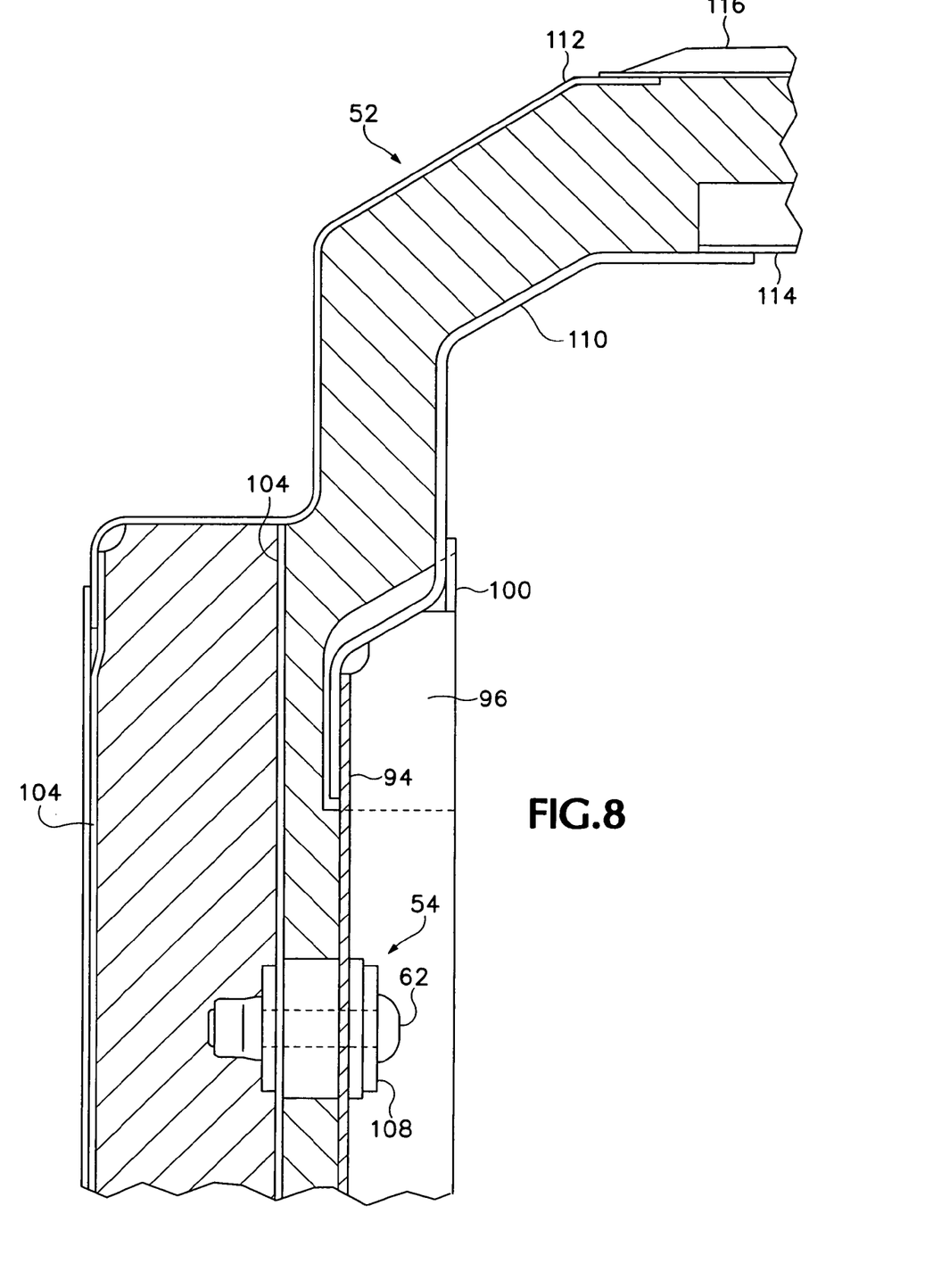
FIG. 8 is a sectional view taken along line 8-8 of FIG. 1 showing a top chord having an inner structural member and an outer structural member separated from one another by thermally insulative material.

Referring to FIG. 8, each of the side posts 54 may be attached at their upper end to a top chord 52 itself comprising an inner top chord 110 and an outer top chord 112, separated by thermally insulated material such as polyurethane foam. The lower end of the inner top chord 110 may preferably be welded to the central member 94 of the inner side post member 90. The upper portion of the top chord may preferably provide a horizontal surface upon which a lower roof member 114 of the roof 40 may be welded. Similarly, the lower end of the outer top chord 112 may be welded to the wing portion 104 of the outer side post member 92, and the upper end of the outer top chord 112 may provide a horizontal surface upon which a top roof member 116 of the roof 40 may be welded.

As herein disclosed, the insulated structural reinforcements comprising the side sill 42, the end sill 44, the corner posts 50, the top chord 52, and the side posts 54, together with the composite spacers 60 between the floor and the center sill, longitudinal stringers, cross bearers, and cross ties, respectively, as well as the lower and upper members 114 and 116, respectively, of the roof 40, together define a cargo-carrying enclosure 22 of an insulated rail car 20 that has a substantially improved strength and/or insulative capacity over existing rail cars achieved by dramatically reducing the metallic connection between the metal interior enclosure 32 and the outer enclosure 30.

It should be understood that the foregoing description of the shapes of the respective inner and outer member of the side sill 42, end sill 44, side posts 54, etc., although preferable, are not necessary to the disclosed rail car 10. For example, a disclosed side post 54 need not have an inner member 90, with a tail portion 98, and the outer side post member 92 need not be Z-shaped, as specifically described, but may instead be L-shaped, or have any other appropriate configuration.

Figure 9:
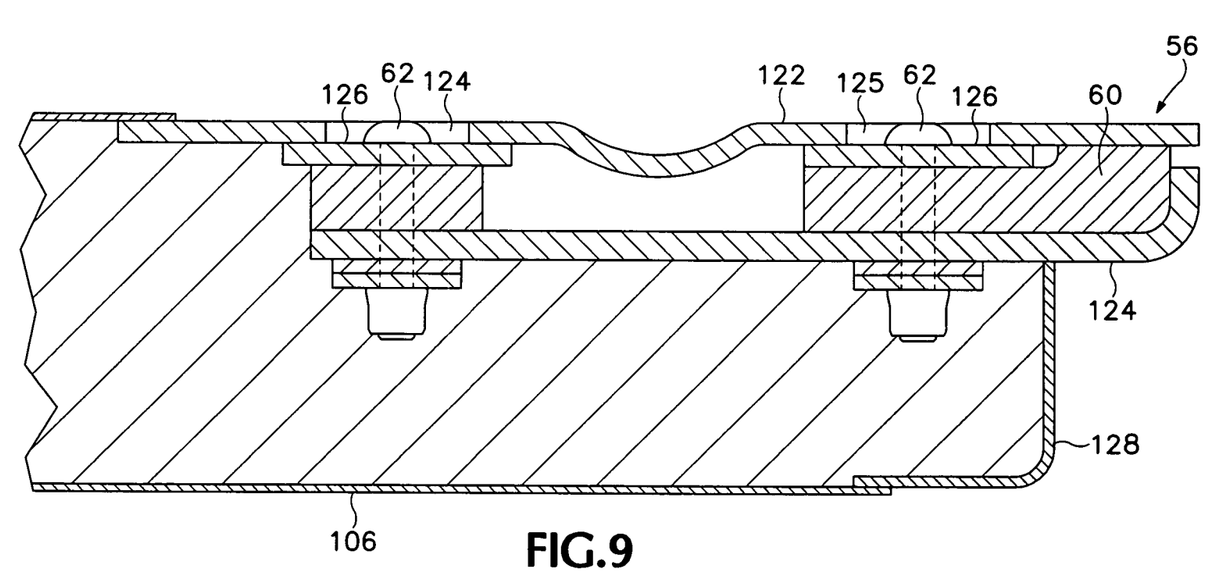
FIG. 9 is a sectional view taken along line 9-9 of FIG. 1 showing a top view of a door post having an inner structural member and an outer structural member separated from one another by a thermally insulative spacer.

Most insulated rail cars such as 20 include a doorway opening 118 (shown in FIG. 1) into the aforementioned cargo carrying enclosure 22, which a plug door 120 (shown in FIG. 10) may selectively open or close. Referring to FIG. 9, to accommodate the doorway opening 118 and the plug door 120, the insulated rail car 20 may also include a door post 56 comprising an inner door post 122 and an outer door post 124 separated from each other by a composite spacer 60 and attached together with two bolts 62, as previously described with respect to the other insulative structural members. The inner door post 122 may define apertures 125 into which the respective heads of the bolts 62 may sit, and spacer members 126 may be welded to the inner door post 122, adjacent the composite spacer 60, to provide a surface upon which the respective heads of the bolts 62 may sit. The inner door post 122 may be outwardly dimpled, as are the inner side posts as previously described, thus forming a space for a floor anchor aperture (not shown) in the floor 36 of the cargo-carrying enclosure 22. The outer door post 124 may have an attached door post extension 128 to which the panels 106 of the exterior side wall 37 may be welded. The door post extension 128 along with the door post 124, a doorway lower threshold 127 (shown in FIG. 10) and a doorway top header 129 (shown in FIG. 11) provide a surface against which the plug door 120 may press when closing the doorway opening 118.

Figure 10:
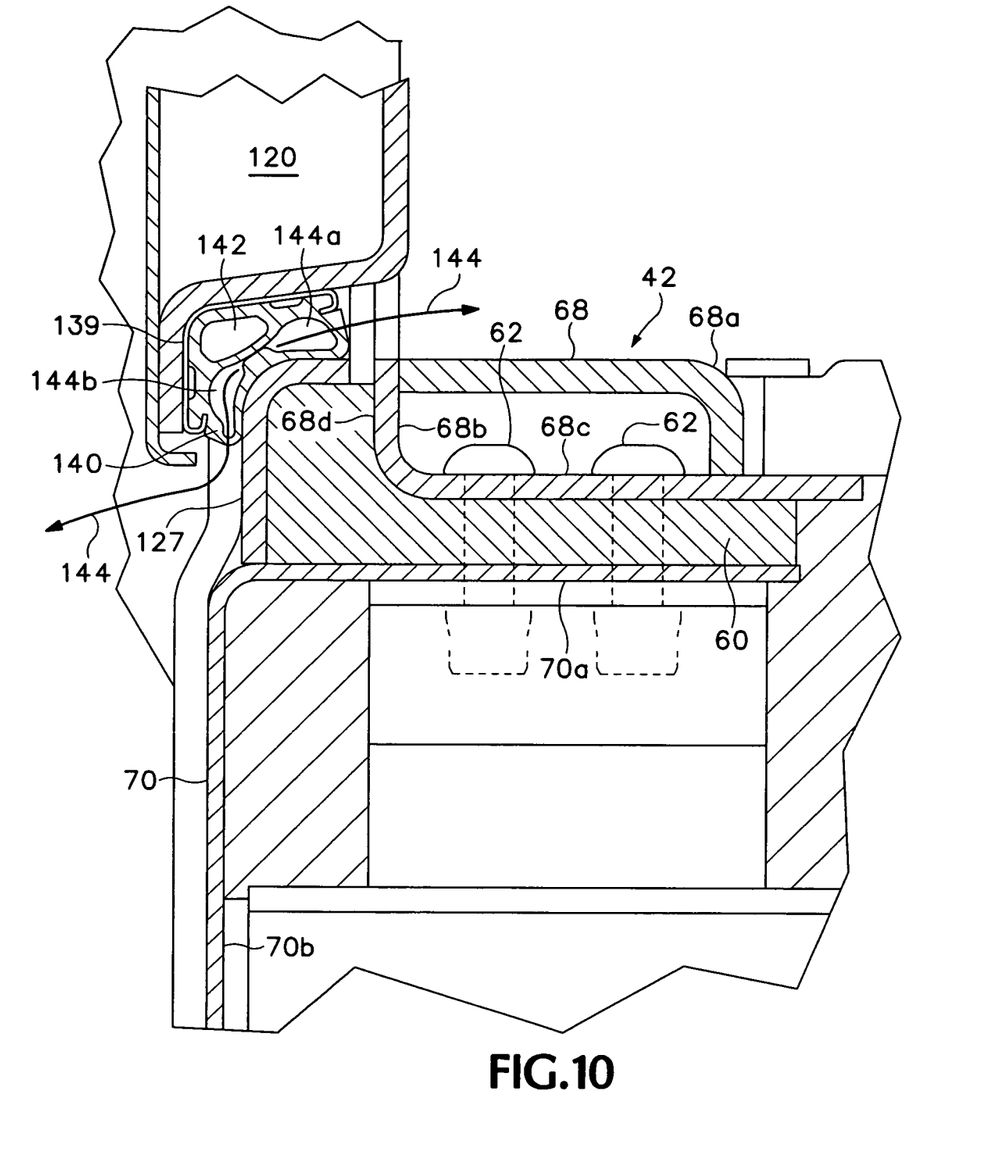
FIG. 10 is a partial sectional view taken along line 10-10 of FIG. 1 showing an end view of side sill having an inner structural member and an outer structural member separated from one another by a thermally insulative spacer and also showing a novel gasket used to seal a door pressed against the side sill.

The composite spacers as herein described, when used in an insulated structural reinforcement such as a door post or side post, for example, may be of any necessary shape. For example, as shown in FIG. 10, due to the presence of a door post 124, the composite spacer 60 separating the inner 68 and outer 70 members of the side sill 42 adjacent the doorway opening 118 may be shaped differently than other insulative spacers 60 in the side sills 42 of the disclosed rail car 20. The composite spacers 60 may be of any appropriate material, such as fiber-reinforced composite material, wood, plastic, etc. In addition, the composite spacers 60 in each insulated structural reinforcement member may be a single member extending longitudinally or laterally, as appropriate, along the length of the insulated structural reinforcement member, or may instead preferably be plural members, evenly spaced longitudinally or laterally, as appropriate, along the length of the insulated structural reinforcement member. In that instance, the resulting gaps between the composite spacers 60 may provide an undesirable space into which polyurethane foam or insulative material may leak, into the doorway opening 118, for example, when being blown into the interstices between the respective inner and outer members of the side walls, roof etc. Therefore, as shown in FIG. 11, it may be desirable to include rope 134 and caulking 136 to seal such openings.

Figure 11:
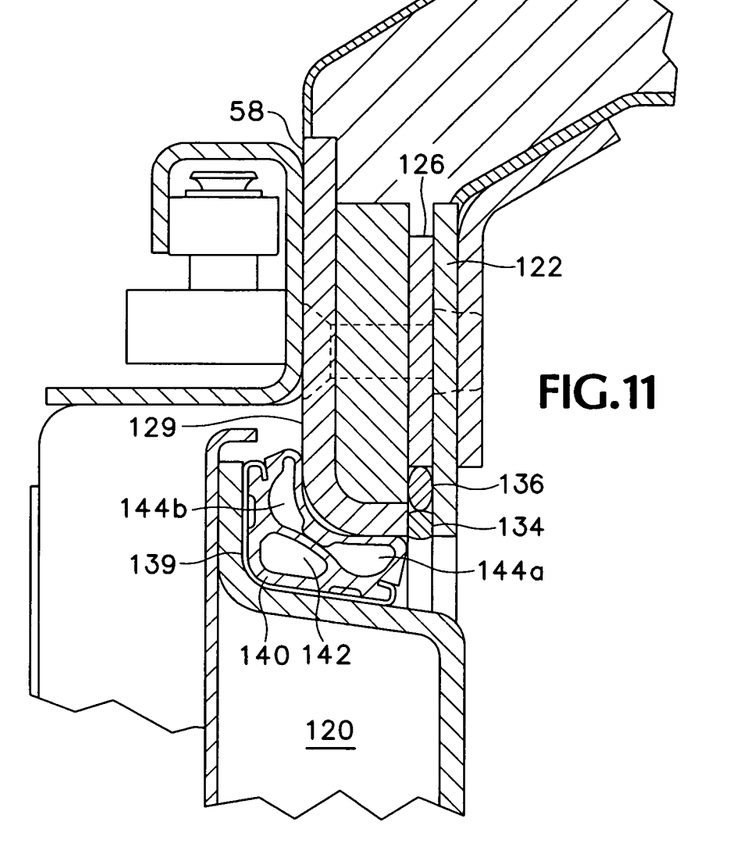
FIG. 11 is a sectional view taken along line 11-11 of FIG. 1 showing an end view of a top chord having an inner structural member and an outer structural member separated from one another by thermally insulative material and also showing a novel gasket used to seal a door pressed against a door header also having an inner structural member and an outer structural member separated from one another by thermally insulative spacer.

Referring specifically to FIGS. 10 and 11, the disclosed rail car 20 includes a novel plug door gasket 140 attached to a bracket 139 of the plug door 120, forming a sealing ring to seal the plug door 120 when it closes against the aforementioned door post extension 128, door post 124, doorway lower threshold 127, and doorway top header 129 together defining a doorway threshold perimeter 141 (shown in FIG. 1). The gasket 140 is preferably made of rubber or other suitably flexible material and defines a first chamber 142 and a second chamber 144, which when pressed into the doorway threshold perimeter 141, divides into sub-chambers 144*a* and 144*b*. The chambers 142 and 144 are filled with air, which provides additional insulation around the perimeter of the plug door. The present inventors have discovered that the second chamber 144, when divided into the aforementioned sub-chambers, provides additional insulative capacity as compared to the instance where the second chamber 144 was not divided, because the heat flow through the path marked with an arrow in FIG. 10 must pass through the gasket 140, the sub-chamber 144*b*, the gasket a second time, the sub-chamber 144*a*, and the gasket yet a third time. Thus by isolating the sub-chambers 144a and 144b from each other when closed, the gasket 140 prevents the air in the respective chambers from intermixing and thereby allows for the intervening portion of the gasket to provide a temperature gradient that would otherwise not be present.

Referring to FIGS. 3 and 4, the rail car 20 preferably includes a floor 36 that is thermally insulated from the structural members comprising the undercarriage 24, including the center sill 34, body bolster 35, cross bearers 48, and cross ties (not shown). As stated previously, the floor 36 may be thermally insulated from the center sill 34 by the placement of the composite bar 64 between the floor 36 and the center sill 34. Similarly, the floor 36 may be thermally insulated from the cross bearers 48 and cross ties by the placement of composite spacers 60 between the longitudinal stringers 46, which support the floor 36, and the cross bearers 46 and cross ties, respectively.

Referring to FIGS. 12-15, the longitudinal stringers 46 preferably are supported at one end by respective body bolsters 35 in a manner that inhibits heat from traveling from the body bolsters 35 through the longitudinal stringers 46 to the floor 36 and vice versa. The disclosed embodiment, for example, includes a body bolster cover plate 170 mounted to the upper surface of each body bolster 35. Because of the minimal distance between the cover plate 170 and the floor 36, each may be insulated from the other using vacuum packs 150 and composite bars 65, rather than insulative foam. The cover plate 170 may preferably have a width dimension greater than that of the body bolster 35 so that the cover plate 70 has tab portions 172 to either longitudinal side of the body bolster 35. Channeled stringer supports 174 may be welded to the lower surface of each tab portion 172 so that respective notched ends 176 of the longitudinal stringers 46 may be supported by a respective stringer support 174 with an intervening composite spacer 60 between each stringer 46 and its associated supporting stringer support 174. In this manner, as can be easily seen in FIG. 15, the longitudinal stringers 46, which may be welded to the floor 36, do not make thermal contact with either the body bolster 35 or the supporting stringer supports 174 secured to the tab portions 172 of the body bolster cover plate 170.

Figure 16:
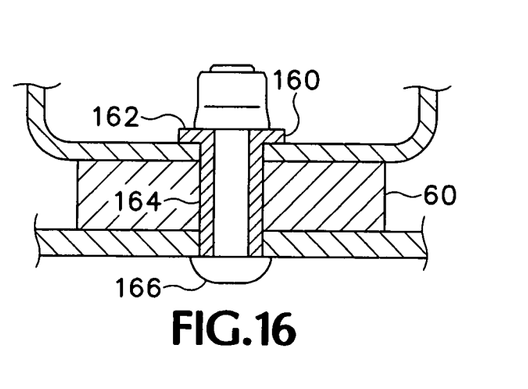
FIG. 16 is an exemplary cross section showing a composite sleeve member around a bolt used to interconnect an inner structural member with an outer structural member.

Referring to FIG. 16 if it is desired to thermally isolate the inner enclosure 32 from the outer enclosure 30 by eliminating the metal connection between the bolts 62 and the respective metal surfaces that they pass through, e.g. the inner enclosure 32, the outer enclosure 30, and the various insulative structural members previously described (such as the exemplary side post support shown in FIG. 16), each of the bolts 62 may be fitted within an insulative sleeve 160 having a flanged collar 162 and a tube 164 through which each bolt 62 respectively passes. The tip of the bolts 62 may then be covered with an insulative cap 166 of composite material.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The invention claimed is:

1. A railway car comprising:
   (a) a cargo-carrying container having an inner enclosure defining an inwardly directed surface against which cargo can bear and an outer enclosure defining an outwardly directed surface exposed to an ambient environment surrounding said boxcar; and
   (b) a structural member having an inner portion supporting said inner enclosure where said inner portion has a self-bounded perimeter surface defining the volume of said inner portion, an outer portion supporting said outer enclosure where said outer portion has a self-bounded perimeter surface defining the volume of said outer portion and where the respective self-bounded perimeter surfaces of said inner portion and said outer portion are different and separated from each other in a direction transverse to a wall supported by at least one of said first portion and said second portion, respectively, and a thermally insulative spacer interposed between and secured to said inner portion and said outer portion; where
   (c) said structural member is a one of:
      (i) a side post;
      (ii) a door post
      (iii) a corner post;
      (iv) a side sill; and
      (v) an end sill.

2. The railway boxcar of claim 1 including a plurality of said structural members, each said structural member being a one of:
   (a) a side post;
   (b) a door post;
   (c) a corner post;
   (d) an end sill; and
   (e) a side sill.

3. The railway boxcar of claim 1 wherein said cargo-carrying container defines a doorway and having at least one door post, said door post having an inner portion supporting said inner surface, an outer portion supporting said outer surface, and a thermally insulative spacer interposed between said inner portion and said outer portion, said spacer thermally isolating said inner portion from said outer portion.

4. The railway boxcar of claim 1 including insulative foam interposed between said inner enclosure and said outer enclosure.

5. The railway boxcar of claim 1 including a fastener that fastens said spacer to said inner portion and said outer portion, respectively.

6. The railway boxcar of claim 1 having a floor and an undercarriage including a center sill, plural cross bearers and cross ties oriented transversely with respect to said center sill, and an insulative spacer interposed between said floor and said center sill.

7. The railway boxcar of claim 6 including a floor including at least one longitudinal stringer and a respective composite spacer interposed between said at least one longitudinal stringer and a respective cross bearer or cross tie.

8. The railway boxcar of claim 1 where said insulative spacer thermally isolates said inner portion from said outer portion.

9. The railway boxcar of claim 1 including a roof having an upper member and a lower member isolated from each other by thermally insulative material.

10. In combination with a cargo-carrying enclosure of a railway car, a vertically-oriented load-bearing post comprising:
   (a) an inner portion having a self-bounded perimeter surface defining the volume of said inner portion;
   (b) an outer portion having a self-bounded perimeter surface defining the volume of said outer portion where the respective self-bounded perimeter surfaces of said inner portion and said outer portion are different and separated from each other in a direction transverse to a wall supported by at least one of said first portion and said second portion, respectively; and (c) a thermally insulative spacer interposed between and secured to said inner portion and said outer portion.

11. The combination of claim 10 where said post is a side post.

12. The combination of claim 10 where said post is a door post.

13. The combination of claim 10 where said post is a corner post.

14. The combination of claim 10 including a horizontally oriented load-bearing sill comprising:
(a) an inner portion;
(b) an outer portion; and
(c) a thermally insulative spacer interposed between said inner portion and said outer portion.

15. The combination of claim 14 where said sill is an end sill.

16. The combination of claim 14 where said sill is a side sill.

17. The combination of claim 14 including a floor and an undercarriage including a center sill, plural cross bearers and cross ties oriented transversely with respect to said center sill, and an insulative spacer interposed between said floor and said center sill.

18. The combination of claim 17 including a floor including at least one longitudinal stringer and a respective composite spacer interposed between said at least one longitudinal stringer and a respective cross bearer or cross tie.

19. The combination of claim 10 including a roof having an upper member and a lower member isolated from each other by thermally insulative material.

20. A railway car having a cargo-carrying container comprising:
(a) a metal outer enclosure exposed to an ambient environment and a metal inner enclosure against which cargo can bear;
(b) a metal support assembly structurally interposed between and structurally supporting said outer enclosure and said inner enclosure; and
(c) a non-metallic insulative layer thermally isolating said inner enclosure from said outer enclosure, such that there is no metallic interconnection between said inner enclosure and said outer enclosure.

21. The railway car of claim 20 including a vertically-oriented load-bearing post comprising:
(a) a metal inner portion;
(b) a metal outer portion; and
(c) a thermally insulative spacer interposed between said inner portion and said outer portion.

22. The railway car of claim 21 including a fastener that fastens said inner portion, said outer portion, and said spacer together.

23. The railway car of claim 22, said fastener comprising metal, and said railway car including at least one thermally insulative sleeve member interposed between said fastener and said inner portion and outer portion, respectively.

24. The railway car of claim 20 including a horizontally-oriented load-bearing sill comprising:
(a) an inner portion;
(b) an outer portion; and
(c) a thermally insulative spacer interposed between said inner portion and said outer portion.

25. The railway car of claim 20 including a floor, a center sill, and a thermally insulative spacer interposed between said center sill and said floor.

26. The railway car of claim 25 including at least one longitudinal stringer and a respective composite spacer interposed between said at least one longitudinal stringer and a respective cross bearer or cross tie.

27. The railway car of claim 20 including a doorway and at least one door post, said door post comprising:
(a) an inner portion;
(b) an outer portion; and
(c) a thermally insulative spacer interposed between said inner portion and said outer portion.

28. The railway boxcar of claim 20 including a roof having an upper member and a lower member isolated from each other by thermally insulative material.

29. The railway car of claim 20 including insulative foam between said inner enclosure and said outer enclosure.

* * * * *